United States Patent
Zhang et al.

(10) Patent No.: US 12,314,419 B2
(45) Date of Patent: May 27, 2025

(54) CROSS-DOMAIN SHARING METHOD AND APPARATUS FOR ZERO-TRUST SENSITIVE BIG DATA BASED ON PRIVACY COMPUTATION

(71) Applicant: NANHU LABORATORY, Zhejiang (CN)

(72) Inventors: Lei Zhang, Zhejiang (CN); Zhichao Yan, Zhejiang (CN)

(73) Assignee: Nanhu Laboratory, Zhejiang (CN)

( * ) Notice: Subject to any disclaimer, the term of this patent is extended or adjusted under 35 U.S.C. 154(b) by 0 days.

(21) Appl. No.: 18/568,596

(22) PCT Filed: Aug. 21, 2023

(86) PCT No.: PCT/CN2023/113926
§ 371 (c)(1),
(2) Date: Dec. 8, 2023

(87) PCT Pub. No.: WO2024/148820
PCT Pub. Date: Jul. 18, 2024

(65) Prior Publication Data
US 2024/0338473 A1   Oct. 10, 2024

(30) Foreign Application Priority Data
Jan. 9, 2023  (CN) .......................... 202310029944.0

(51) Int. Cl.
G06F 21/00  (2013.01)
G06F 21/62  (2013.01)

(52) U.S. Cl.
CPC ............................... G06F 21/6218 (2013.01)

(58) Field of Classification Search
CPC .. G06F 21/6218; G06F 21/6245; G06F 21/64; H04L 63/12; H04L 63/123;
(Continued)

(56) References Cited

U.S. PATENT DOCUMENTS

| 9,208,337 | B2 * | 12/2015 | Tayloe ................. H04L 63/102 |
| 2003/0177363 | A1 * | 9/2003 | Yokota ................. H04L 9/0866 |
| | | | 713/176 |

(Continued)

FOREIGN PATENT DOCUMENTS

| CN | 110034924 A | 7/2019 |
| CN | 114172663 | * 12/2021 ........... H04L 63/083 |

(Continued)

OTHER PUBLICATIONS

Search Report received in International Patent Application No. PCT/CN2023/113926, dated Nov. 13, 2023.

(Continued)

*Primary Examiner* — Joseph P Hirl
*Assistant Examiner* — Chi D Nguy
(74) *Attorney, Agent, or Firm* — Knobbe, Martens, Olson & Bear, LLP (57) ABSTRACT

A cross-domain sharing method and apparatus for zero-trust sensitive big data based on privacy computation is provided, so that a sensitive data provider can safely and fully import data into a database of a computing environment of a data user in a cross-domain manner for secondary use, and ensure that no malicious party can steal original sensitive data. The data user can develop and deploy an application as usual and faces no limitation on a deployment environment. With a zero-trust sharing environment, the sensitive data can be fully provided for a user area while the data provider only needs to examine the application of the user and approve the application to use the corresponding sensitive data if the application does not have a malicious leakage behavior. Further, the data provider can terminate data use by the application at any time by disabling an account.

7 Claims, 3 Drawing Sheets

(58) Field of Classification Search
CPC .. H04L 63/166; H04W 12/02; H04W 12/033; H04W 12/106
See application file for complete search history.

(56) References Cited

U.S. PATENT DOCUMENTS

| | | | |
|---|---|---|---|
| 2011/0224509 A1* | 9/2011 | Fish | G06F 21/6245 600/301 |
| 2015/0304110 A1* | 10/2015 | Oberheide | H04L 9/3215 713/155 |
| 2018/0253539 A1* | 9/2018 | Minter | G06F 21/64 |
| 2019/0361901 A1* | 11/2019 | Purves | G06Q 20/36 |
| 2020/0028693 A1 | 1/2020 | Wu et al. | |
| 2020/0151348 A1* | 5/2020 | Chauhan | H04L 67/53 |
| 2021/0168125 A1* | 6/2021 | Vemulpali | H04L 63/062 |
| 2022/0021516 A1* | 1/2022 | Kurian | H04L 9/0894 |
| 2022/0284118 A1* | 9/2022 | Kaul | G06T 5/50 |
| 2022/0292222 A1* | 9/2022 | Tikhomirov | G06F 21/6263 |
| 2023/0134781 A1* | 5/2023 | Senerth | G06F 21/6245 726/26 |
| 2024/0126916 A1* | 4/2024 | Nguyen | G06F 21/602 |

FOREIGN PATENT DOCUMENTS

| | | | | |
|---|---|---|---|---|
| CN | 114936365 | * | 1/2022 | ............ G06F 21/57 |
| CN | 114117522 | A | 3/2022 | |
| CN | 114679270 | A | 6/2022 | |
| CN | 115580413 | A | 1/2023 | |
| CN | 115730338 | A | 3/2023 | |

OTHER PUBLICATIONS

First Office Action in Chinese Patent Application No. 202310029944.0, dated Mar. 14, 2023.
Notification to Grant Patent Right for Invention in Chinese Patent Application No. 202310029944.0, dated Apr. 2, 2023.

* cited by examiner

CROSS-DOMAIN SHARING METHOD AND APPARATUS FOR ZERO-TRUST SENSITIVE BIG DATA BASED ON PRIVACY COMPUTATION

CROSS REFERENCE TO RELATED APPLICATION

This patent application is a national stage of International Application No. PCT/CN2023/113926, filed on Aug. 21, 2023, which claims the priority of Chinese Patent Application No. 202310029944.0 filed with the China National Intellectual Property Administration on Jan. 9, 2023 and entitled as "CROSS-DOMAIN SHARING METHOD AND APPARATUS FOR ZERO-TRUST SENSITIVE BIG DATA BASED ON PRIVACY COMPUTATION". Both of the aforementioned applications are incorporated by reference herein in their entireties.

TECHNICAL FIELD

The present disclosure relates to the technical field of data security, and particularly relates to a cross-domain sharing method and apparatus for zero-trust sensitive big data based on privacy computation.

BACKGROUND

At present, a vast number of sensitive data in the fields of government affairs, finance, medical care, and so on can play diversified roles only after cross-domain sharing.

Based on conventional technical means at present, a data provider is likely to lose control over the data that have entered a user area during cross-domain sharing. Consequently, the data will be readily stolen by a data user or malicious personnel during transmission, storage, or use.

In the prior art, it is common practice to keep the data within its domain in order to ensure security of sensitive data. When a user attempts to use data in other domains, an application developed by the user can be deployed in a computer room of the data provider to directly pull the data for use; and alternatively, the data provider can develop a corresponding application programming interface (API) for the data user according to desired data requirements of the user. Both solutions have major technical defects, which dramatically constrain data sharing and use convenience and still pose security risks.

Actual resources of the data provider, such as computation resources and networks, have to be occupied when the application is deployed to the computer room of the data provider. An application provider does not control a server for application deployment, leading to difficulties in application maintenance. Therefore, such a sharing mode can only be applicable to scenarios where sensitive data are used by a limited number of simple applications, instead of being used on a large scale.

With the API offered, a development workload of the data provider will be increased accordingly. Such a customized interface mode is only applicable to a small number of scenarios with a small data size. The interface mode has to be re-customized and re-developed when a service scenario is changed, and thus cannot be applied on a large scale. Moreover, the API mode still has the risk of exposing original data to the user.

SUMMARY

Aiming at the above problems, an objective of some embodiments of the present disclosure is to provide a cross-domain sharing method and apparatus for zero-trust sensitive big data based on privacy computation to construct a zero-trust data storage, transmission, and use environment, so that a sensitive data provider can safely and fully import data into a database of a computing environment of a data user in a cross-domain manner for secondary use, and can still ensure that no malicious party can steal original sensitive data.

To achieve the above objective, the present disclosure employs the technical solution as follows.

A cross-domain sharing method for zero-trust sensitive big data based on privacy computation, comprising following steps executed by a data user:

establishing an encrypted communication link with a data provider:

registering an application (app) of the data user in the data provider and specifying corresponding sensitive data:

downloading an application (app') embedded with an account information acquisition tool from the data provider:

receiving the sensitive data sent by the data provider through the encrypted communication link and a measurement (app_hash) of the application (app'):

updating the application (app) of the data user as the application (app') embedded with the account information acquisition tool:

storing the sensitive data in a database instance X created for the sensitive data, and assigning account information X' created for the sensitive data to the application (app'), where the account information X' is created to access only the database instance X:

encrypting and storing the sensitive data of the database instance X and a corresponding relation between the measurement (app_hash) of the application and the account information X' in a server disk through a transparent file encryption service:

activating the application (app') in a trusted execution environment (TEE), acquiring the measurement (app_hash) of the application (app), remotely requesting the corresponding account information X' through the measurement (app_hash), and sending the account information X' to the application (app); and causing the application (app) to log in the corresponding database instance X with the account information X' in the TEE to acquire the corresponding sensitive data and run a corresponding service logic in the TEE to use the sensitive data.

In the above cross-domain sharing method for zero-trust sensitive big data based on privacy computation, in a deployment phase, the encrypted communication link between the data user and the data provider is established as follows:

S11: activating by the data user an encrypted database module in the TEE:

S12: determining by a self-signature tool of the encrypted database module whether a self-signed certificate has been generated, if yes, decrypting a service-end certificate file (Cert1) and a service-end private key file (PrivateKey1) of an existing certificate through the transparent file encryption service, otherwise generating by the self-signature tool a self-signed certificate file including a root certificate file (CA1), the service-end certificate file (Cert1), and the service-end private key file (PrivateKey1), and encrypting and storing Cert1 and PrivateKey1 in the server disk through the transparent file encryption service; and S13: configuring the root certificate file (CA1) to the data provider as a verification certificate for establishing transport layer security (TLS) communication with the data provider.

In the above cross-domain sharing method for zero-trust sensitive big data based on privacy computation, a key used by the transparent file encryption service is configured as follows:

after the encrypted database module is activated, deriving by the TEE a unique corresponding key for the encrypted database module based on a measurement (hash) of the encrypted database module and configuring the key to the transparent file encryption service, so that a file to be stored in the server disk is transparently encrypted or decrypted.

In the above cross-domain sharing method for zero-trust sensitive big data based on privacy computation, when receiving an application registration request and a specified sensitive data use requirement, the data provider executes following steps:

examining the application (app), and if the examining is passed, embedding the account information acquisition tool in the application (app), and measuring the application (app) to obtain the app_hash; and binding the app_hash to a database name X, and sending a binding relation between the measurement (app_hash) of the application (app') embedded with the account information acquisition tool and the database name X to the encrypted database module of the data user through the encrypted communication link for encryption and storage.

In the above cross-domain sharing method for zero-trust sensitive big data based on privacy computation, after receiving information sent by the data provider, the data user executes a following step:

creating the database instance X and the account information X' that accesses only the database instance X, and encrypting and storing the corresponding relation between the app_hash and the account information X' in the server disk through the transparent file encryption service, so that the account information X' is assigned to the corresponding application (app').

In the above cross-domain sharing method for zero-trust sensitive big data based on privacy computation, the application of the data user uses the corresponding sensitive data as follows:

activating the app' in the TEE, where the account information acquisition tool acquires an application running report embedded with an app_hash measured by the TEE based on a remote certification mechanism of the TEE, and generates a self-signed certificate (ra-cert) embedded with report information:

initiating by the app' a request for establishing the encrypted communication link based on a TLS communication protocol to an account management service of the encrypted database module through the ra-cert, where the account management service is configured to manage database instances and account information of each database instance:

after receiving the request, extracting by the account management service the report from the certificate, and verifying the report through a public certificate (CA_TEE) provided by a TEE hardware provider:

if verification is passed, exacting the app_hash from the report, searching by the account management service for the corresponding account information X', and sending the account information X' to the account information acquisition tool:

after acquiring the account information X', writing by the account information acquisition tool in the app' the account information X' into an environment variable of a TEE running environment:

after acquiring the account information X', activating by the account information acquisition tool a service application, acquiring by the service application the account information X' from the environment variable, and initiating a connection request to an ordinary database of the encrypted database module through the account information, where the ordinary database includes the database instances:

verifying, by the ordinary database, login information, after verification is passed, in respond to an app' request, sending the corresponding sensitive data to the app'; and acquiring by the app' the sensitive data, and running the corresponding service logic in an encrypted memory of the TEE to use the sensitive data.

In the above cross-domain sharing method for zero-trust sensitive big data based on privacy computation, the application running report is signed through a hardware private key of the TEE and embedded in the self-signed certificate (ra-cert).

A cross-domain sharing apparatus for zero-trust sensitive big data based on privacy computation, including a sensitive data management module mounted at a data provider and an encrypted database module mounted at a data user, where the sensitive data management module includes an application management sub-module, a multi-source database management sub-module, and a data transmission tool sub-module, and the encrypted database module includes an ordinary database sub-module, an account management service sub-module, a transparent file encryption service sub-module, and a self-signature tool sub-module;

the application management sub-module is configured for application registration and data binding;

the multi-source database management sub-module is configured to generate a corresponding transmission configuration for the data transmission tool sub-module according to a sensitive database and an ordinary database in the encrypted database module;

the data transmission tool sub-module is configured to transmit specified sensitive data to the data user through an encrypted communication link based on the transmission configuration;

the ordinary database sub-module is configured to store the sensitive data provided by the data provider;

the transparent file encryption service sub-module is configured to provide a transparent file encryption capacity;

the self-signature tool sub-module is configured to generate a self-signed certificate for the encrypted database module, where the encrypted database module establishes the encrypted communication link with the data provider based on the self-signed certificate; and the account management service sub-module is configured to add or delete a database instance, add or delete a database account, and assign a database account to an application.

In the above cross-domain sharing apparatus for zero-trust sensitive big data based on privacy computation, the application management sub-module is configured to examine an application of the data user, embed an account information acquisition tool in the application, measure a final application to obtain a measurement (app_hash), and package the application into a runnable container application image to complete application registration;

the application management sub-module is configured to bind a sensitive data set selected by the data user to the measurement (app_hash) to complete data binding of the application;

the account management service sub-module is configured to create a database instance and database account information for the application, where the sensitive data set bound to the application is stored in a corresponding database instance: a database account is assigned to a corresponding application by binding the account information to the app_hash of the application; the application reads the sensitive data stored in the corresponding database instance based on the account information; and     the sensitive data received by the data user and a binding relation between the account information and the app_hash of the application are encrypted and stored in a server disk through the transparent file encryption service sub-module.

In the above cross-domain sharing apparatus for zero-trust sensitive big data based on privacy computation, a key for the transparent file encryption service sub-module to encrypt a file is derived by a TEE of the data user based on a measurement (hash) of the encrypted database module.

The present disclosure has the advantages as follows.

In terms of security, the present disclosure has the following advantages. Firstly, the sensitive data is exported into a data user area, and a TEE technology can ensure that the applications such as an encrypted database in the user area are in an encrypted state, and the data are in a zero-trust state during sharing. Secondly, a self-signature tool is embedded in an encrypted database application. Therefore, a certificate is generated in the TEE, and the certificate and the data are encrypted and stored through a key derived from a chip bound to a software measurement, so that transmission and storage of the ordinary database are in a zero-trust state. Thirdly, the application of the data user runs in the TEE, and a secure communication link is established through a hardware report embedded with a measurement to transfer the sensitive data, so that the security of data transmission is ensured. Fourthly, the database account management service runs in the TEE, so that information generated when a new account is created is suppressed in the TEE, and important information such as an account password is not leaked.

In terms of universality, the present disclosure has the following advantages. The data user can develop and deploy the application as usual and faces no limitation on a deployment environment. With a zero-trust sharing environment, the sensitive data can be fully provided for a user area while the data provider only needs to examine the application of the user and approve the application to use the corresponding sensitive data if the application does not have a malicious leakage behavior. Further, the data provider can terminate data use by the application at any time by disabling an account, etc., which is applicable to a sensitive data sharing scenario with a large data size.

DETAILED DESCRIPTION OF THE EMBODIMENTS

The present disclosure will be further described in detail below with reference to the accompanying drawings and particular implementation. The present solution provides a cross-domain sharing method and apparatus for zero-trust sensitive big data based on privacy computation, which applies a chip-level trusted execution environment (TEE) technology based on privacy computation. According to the technology, a trusted secure environment is constructed through trusted and tamper-resistant software and hardware. That is, in the hardware, a chip instruction set directly assigns an encrypted memory to the sensitive data, and all software programs run in the encrypted memory. Moreover, other portions in the hardware cannot access information in the isolated memory except for an authorized interface. Accordingly, a program code or the data are prevented from being stolen or tampered by an operating system or other applications. Differing from an ordinary operating environment, a trusted computation environment has a very small attack interface. Even in the case that the operating system, a network, and a kernel layer are cracked, the data can still be prevented from being leaked or stolen.

Figure 1:
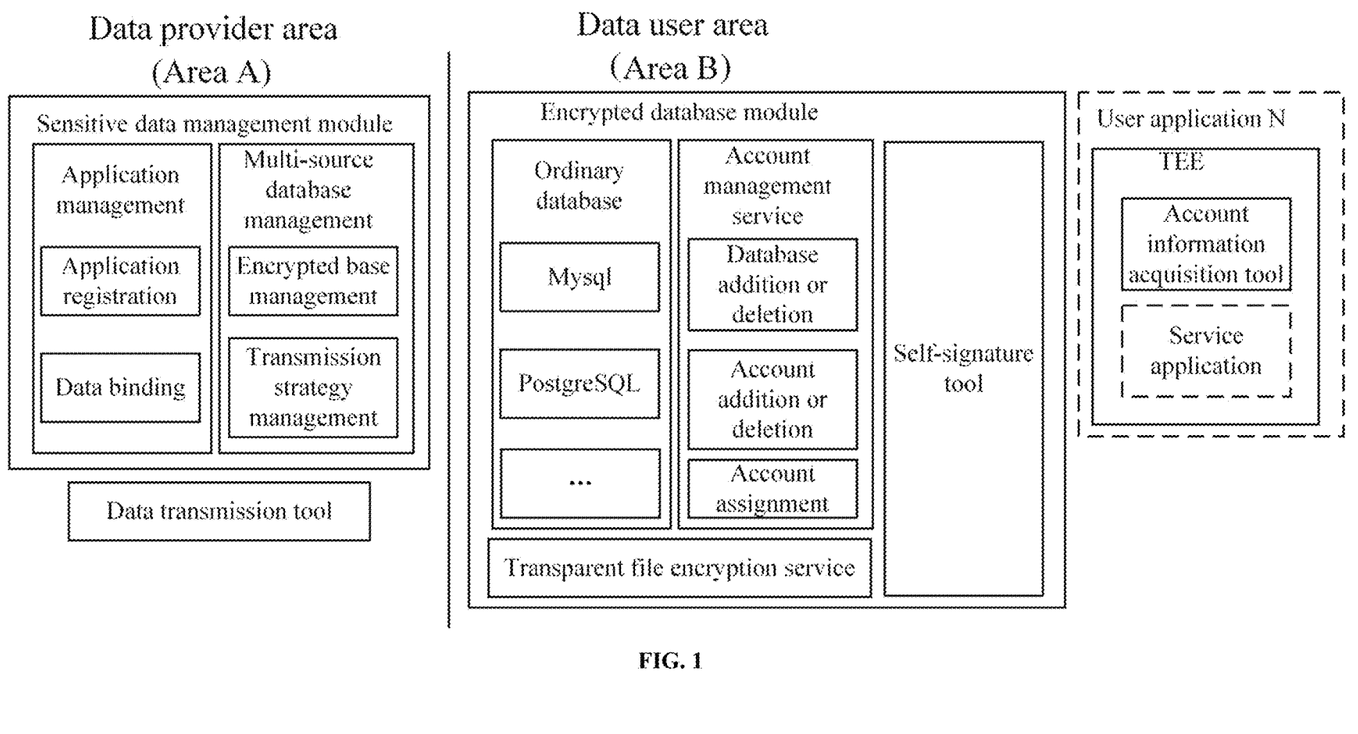
FIG. 1 is a structural block diagram of a cross-domain sharing apparatus for zero-trust sensitive big data based on privacy computation according to the present disclosure.

As shown in FIG. 1, the cross-domain sharing apparatus for zero-trust sensitive big data based on privacy computation provided by the present solution includes a sensitive data management module configured to be deployed in a data provider area and an encrypted database module configured to be deployed in a data user area.

The sensitive data management module includes an application management sub-module, a multi-source database management sub-module, and a data transmission tool sub-module.

The application management sub-module is mainly configured for application registration and data binding. The application registration means that an application developed by a data user is examined, an account information acquisition tool is embedded in the application, and a final application is measured to obtain a measurement (app_hash) and finally packaged into an runnable container application image. In this case, the application consists of a service application configured to execute service logic and the account information acquisition tool embedded by a data provider. Data binding means that a sensitive data set selected by the data user is bound to a unique measurement (app_hash) of the application, and a binding result is encrypted and sent to the multi-source database management sub-module through transport layer security (TLS).

The multi-source database management sub-module is mainly configured for encrypted database management and transmission strategy management. The encrypted database management, encrypted base management for short, is configured to interface with the encrypted database module deployed in the data user area and send operation instructions such as database initialization, account information update, and database instance creation to the encrypted database module in a cross-domain manner. The transmission strategy management is mainly used for generating a data transmission strategy according to the sensitive data set selected by the data user and generating different transmission configurations for a data transmission tool according to a difference between a database in the encrypted database module and a sensitive database.

The data transmission tool sub-module is mainly configured to transmit the sensitive data. The tool is configured with account information of the sensitive database in the data provider area and an ordinary database of the encrypted database module in the data user area. One end of the tool is connected to the sensitive database, and the other end of the tool is connected to the ordinary database in the data user area, so that the tool becomes a data transmission bridge. Specified sensitive data are encrypted and transmitted to the data user area through TLS according to the data transmission strategy generated by the multi-source database management sub-module.

The encrypted database module runs in a trusted execution environment (TEE) of the data user and mainly includes a transparent file encryption service sub-module, an ordinary database sub-module, an account management service sub-module, and a self-signature tool sub-module.

The transparent file encryption service sub-module mainly provides a transparent file encryption capacity: That is, based on the capacity, other programs can store files in the server disk like using an ordinary file system. However, the file actually stored in the disk is encrypted, and thus the program also has an automatic decryption capacity when reading the file. A key for the encryption service is derived by the TEE and bound to a hash of the encrypted database module. That is, only an encrypted database module application approved by the data provider can generate a correct encryption or decryption key, so that the data stored in the encrypted database can be in a zero-trust state.

The ordinary database sub-module is configured to store the exported sensitive data for use by the application of the user. According to the requirements of the user, the ordinary database sub-module can be any database that supports TLS transmission and account authentication, such as MySQL. PostgreSQL, etc. The ordinary database runs in the TEE and stores the data encrypted through the transparent file encryption service. Therefore, the database and the data stored therein are in an encrypted state.

The account management service sub-module provides a database instance addition or deletion function, a database account addition or deletion function, and an account assignment function. Database instance addition or deletion and database account addition or deletion are configured to execute operation instructions sent by the sensitive data management module, such as ordinary database initialization, account information update, and database instance creation. Account assignment is to assign database account information bound to the application to a running application. The account assignment herein has a remote TEE authentication capacity. That is, a secure channel is established to transmit the account information by verifying a trusted hardware report acquired when the application runs in the TEE. Since account assignment logic and the application of the user run in the TEE, the account information is in a zero-trust encrypted state no matter in a transmission state or a running state. Accordingly, the security of the account information can be effectively protected.

The self-signature tool sub-module is configured to generate an ephemeral elliptic curve Diffie-Hellman (ECDHE) self-signed certificate based on an elliptic curve algorithm in the TEE. It should be noted that a service-end certificate and a private key generated through a self-signature tool are encrypted and stored through the transparent file encryption service. Therefore, a generated certificate system cannot be cracked by a man-in-the-middle, so that the security of the communication link established thereby can be ensured.

Figure 2:
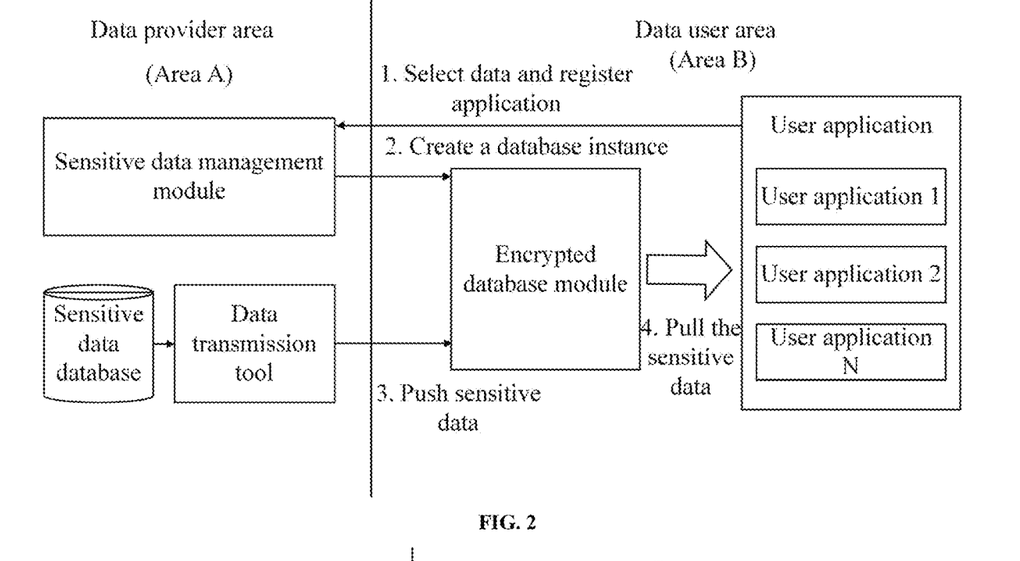
FIG. 2 is an overall flowchart of a cross-domain sharing method for zero-trust sensitive big data based on privacy computation according to the present disclosure.

As shown in FIG. 2, a specific application scenario of the cross-domain sharing method for zero-trust sensitive big data based on privacy computation provided by the present solution is as follows: a data provider and a data user are positioned in two areas, respectively, which may be two different server rooms in practice. Herein, area A denotes a data provider area, and area B denotes a data user area. Area A and area B are isolated from each other, and a server in area A can only be managed by the data provider, while a server in area B can only be managed by the data user. The data provider is required to import the sensitive data from area A into the server in area B. However, the data provider is also required to ensure that the data user can only perform limited-access and use on the sensitive data through an application approved by the data provider without stealing all imported sensitive data in area B controlled by the data user.

Entire steps are as follows:
1) The data user develops a corresponding application (app) according to basic information of the sensitive data to be used, registers its own application in a sensitive data management module after development, and selects the corresponding sensitive data for binding.
2) The data provider pushes the sensitive data from area A to an encrypted database module in area B through a data transmission tool.
3) A sensitive data management module of the data provider instructs the encrypted database module of the data user to create a database instance and a corresponding account and encrypt and save account login information at the data user.
4) The data user activates the application, acquires the account login information from the encrypted database module, logs in an encrypted database, and pulls the data for use.

In order to ensure the data security during cross-domain sharing, a method is designed through the TEE to enable application components in the data user area (area B) to be in a zero-trust state.

The so-called zero-trust state means that during cross-domain sharing, the data are in an encrypted state no matter in transmission, storage, or running states. Also, an encryption key cannot be known or acquired by any artificial entity. A software program cannot be tampered while only the application approved by the data provider can log in to acquire the data. In this state, even if malicious personnel have the highest permission for a software program running server or the server is cracked at a software level, the data used, stored, and transmitted during software running still cannot be modified or stolen. Therefore, even though having been imported into area B controlled by the data user, the data still cannot be maliciously stolen by the user in area B.

Figure 3:
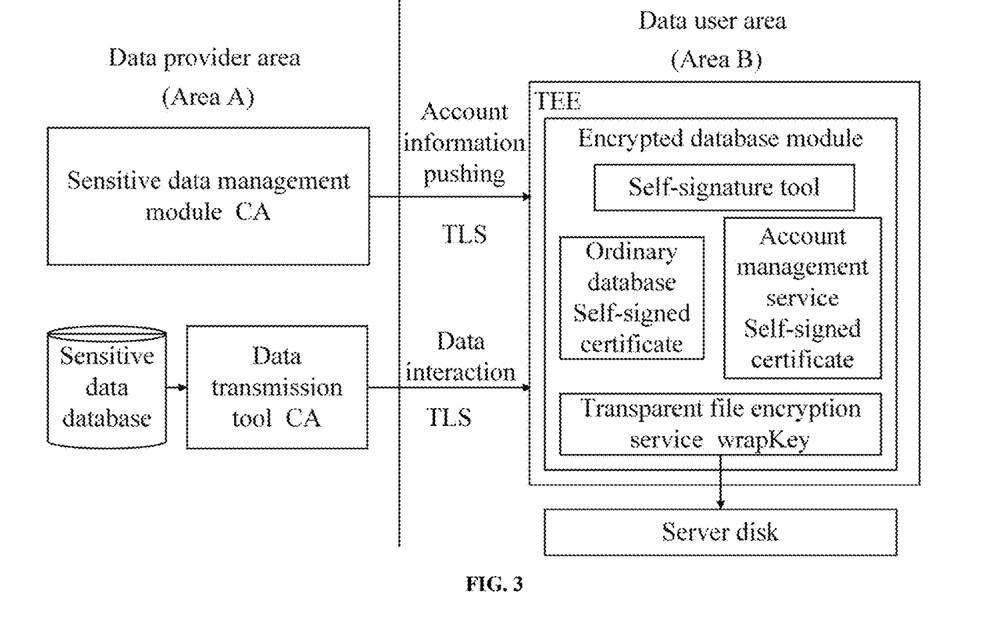
FIG. 3 is a schematic diagram illustrating the export of sensitive data from a data provider to a data user in a cross-domain sharing method for zero-trust sensitive big data based on privacy computation according to the present disclosure.

As shown in FIG. 3, relevant steps of the method are described in detail below in combination with sensitive data export and sensitive data use by an application.

Deployment phase
1) The self-signature tool and the transparent file encryption service are embedded in the encrypted database module, and an encrypted database module application package is measured to obtain hash1 before deployment.
2) The encrypted database module is activated in the TEE, and the TEE loads the encrypted database module into an encrypted memory (the encrypted memory is provided based on the capacity of the TEE, and a memory encryption key is only visible to a chip) during activation.
3) After the encrypted database module is loaded into the memory, a hash of the encrypted database module application package is re-measured in the TEE. When the hash is consistent with hash1, the application starts to run, otherwise directly reports an error and exits. The process ensures the security of the encrypted database module, which is loaded into the encrypted memory for the first time.
4) After the encrypted database module is activated, the TEE derives a unique corresponding key for the encrypted database module based on the hash and configures the key to the transparent file encryption service for transparently encrypting or decrypting a file to be stored in a server disk. The key is directly derived from a chip by the TEE and bound to the hash. Accordingly, only an encrypted database module application corresponding to the hash can acquire a correct key.
5) The self-signature tool of the encrypted database module determines whether a self-signed certificate has been generated, if not, the self-signature tool is used to generate a self-signed certificate file (including a root certificate file (CA1), a service-end certificate file (Cert1), and a service-end private key file (PrivateKey1)), and Cert1 and PrivateKey1 are encrypted and stored in the server disk in area B through the transparent file encryption service, and CA1 is stored in the disk in area B without being encrypted.
6) The encrypted database module activates an ordinary database (in the method, the database can be any database that supports TLS transmission and account authentication, such as MySQL, PostgreSQL, etc.) and an account management service, opens a TLS communication link to the outside, and uses the self-signed certificate file in step 5) as a certificate of the TLS communication link.
7) The ordinary database and the account management service store data in an external server disk through the transparent file encryption service.
8) CA1 generated through the encrypted database module is exported and configured to the data transmission tool and the sensitive data management module as a verification certificate for establishing TLS communication with the encrypted database module.
9) The data provider initializes the ordinary database in area B through the sensitive data management module in area A, and the sensitive data management module is connected to the account management service through the TLS communication link to instruct the account management service to create an account.
10) The data provider configures database information of the ordinary database in area B to the data transmission tool, and simultaneously configures database information of the sensitive database to the data transmission tool. Therefore, a transmission passage between the sensitive database in area A and the ordinary database in area B is opened and configured to transmit the sensitive data to the data user and instruct the data user to create the database instance, etc. for the sensitive data.

In addition, in the deployment process, the data provider simultaneously updates a super administrator account password of the ordinary database of the data user and saves account data into the server disk in area B through the transparent file encryption service. The data provider instructs the data user to log in with the super administrator account password, create the database instance and write data.

Running Phase
1) When the data user submits the application and makes a request to use a data dbname for the sensitive data management module, the data provider starts to examine whether the application of the user maliciously uses or leaks the sensitive data.
2) If an examination is passed, the account information acquisition tool is embedded in the application, and the application is measured to obtain the app_hash.
3) The sensitive data management module binds the app_hash to a database instance name dbname and sends binding information to the account management service of the encrypted database module through the TLS encrypted communication link established through CA1. The database instance can be named in other ways instead of being limited to dbname. One data user has different database instance names for distinguishing.
4) After receiving the binding information, the account management service creates a database instance named dbname in the ordinary database and account information dbaccount that can access only the database, binds the app_hash to the dbaccount, and encrypts and stores binding information in the disk through the transparent file encryption service.
5) The data transmission tool and the ordinary database of the encrypted database module establishes the TLS communication link through CA1 and exports the sensitive data required by the data user from the sensitive database in area A to the database instance dbname in area B.
6) After receiving the sensitive data, the ordinary database encrypts and stores the data in the server disk through the transparent file encryption service to complete an entire sensitive data export process.

Figure 4:
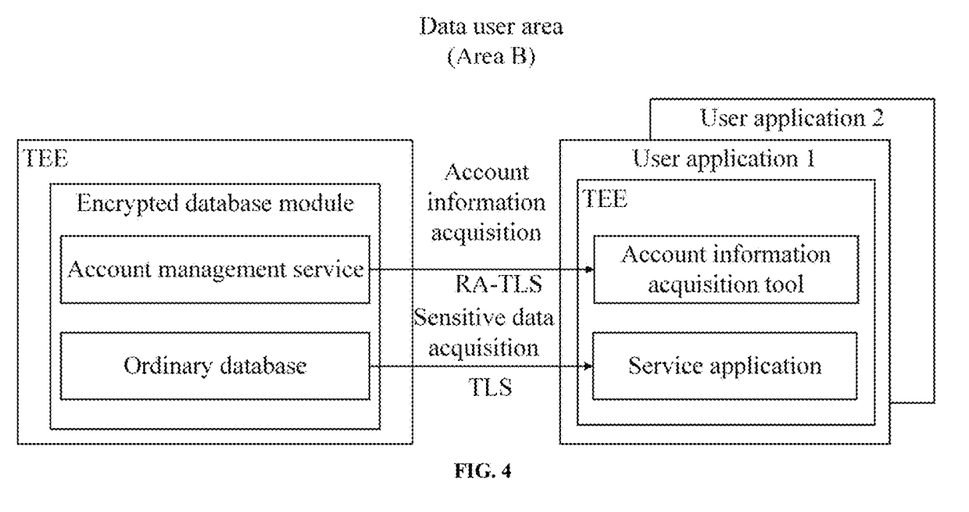
FIG. 4 is a schematic diagram illustrating the use of sensitive data by an application of a data user in a cross-domain sharing method for zero-trust sensitive big data based on privacy computation according to the present disclosure.

FIG. 4 is a schematic diagram illustrating the use of sensitive data by an application. The data user uses the data by developing a service application. Specific steps are as follows:
1) The data user develops the service application according to conventional application development steps.
2) After being developed, the application (app) is submitted to the sensitive data management module of the data provider for examination.
3) After the application (app) passes the examination, the data provider embeds the account information acquisition tool in the service application (app) to generate the application app' passing the examination, and performs application registration and data export according to steps in the running phase.
4) It is assumed that the steps in the running stage have been completed, that is, a hash of the app' has been measured as the app_hash, the sensitive data have been imported into the database instance dbname, and corresponding information between the database account information dbaccount and the app_hash has been encrypted and stored in the account management service.

5) The data user activates the app' in the TEE in area B.
6) After the app is activated, the account information acquisition tool acquires an application running report (the report is embedded with the app_hash measured by the TEE and signed through a hardware private key unknown to the TEE) based on a remote certification mechanism of the TEE, and then generates the self-signed certificate (ra-cert) embedded with report information. The self-signed certificate (ra-cert) is generated through the account information acquisition tool and configured to implement the encrypted communication link between the app' and the encrypted database module.
7) The app' initiates a request for establishing the encrypted communication link based on a TLS communication protocol to the account management service of the encrypted database module through the ra-cert, that is. RA-TLS in FIG. 4.
8) After receiving the request, the account management service extracts the report from the certificate and verifies the report through a public certificate (CA-_TEE) provided by the TEE hardware provider. A verification process can ensure that the report is generated through a TEE hardware in a real TEE, and therefore the correctness of the app_hash is ensured.
9) If verification is passed, the app_hash is extracted from the report, and the account management service searches for corresponding dbaccount information, responds to the app' to complete establishment of the RA-TLS encrypted communication link, and sends the dbaccount information to the app'.
10) After acquiring the dbaccount information, the account information acquisition tool in the app' writes the dbaccount information into the environment variable of the TEE running environment.
11) After acquiring the dbaccount information, the account information acquisition tool activates the service application. The service application acquires the dbaccount from the environment variable and initiates a connection request to the ordinary database of the encrypted database module through the account information.
12) The ordinary database verifies login information, after verification is passed, in response to an application request, sends the data to the application (app).
13) The application (app') acquires the sensitive data and runs the corresponding service logic in the encrypted memory in the TEE to use the sensitive data.

According to the method and apparatus provided by the present solution, a zero-trust data storage, transmission, and use environment is constructed to export the sensitive data into the data user area. The TEE technology can ensure that the applications such as the encrypted database in the user area are in the encrypted state, and the data are in the zero-trust state during sharing. The self-signature tool is embedded in an encrypted database application. Therefore, the certificate is generated in the TEE, and the certificate and the data are encrypted and stored through the key derived from the chip bound to a software measurement, so that transmission and storage of the ordinary database are in the zero-trust state. The application of the data user runs in the TEE, and the secure communication link is established through the hardware report embedded with a measurement to transfer the sensitive data, so that the application is in the zero-trust state when in use. The database account management service runs in the TEE, so that information generated when a new account is created is suppressed in the TEE, and important information such as the account password is not leaked.

The specific embodiments described herein are merely illustrative of the spirit of the present disclosure. Those skilled in the art to which the present disclosure pertains can make various modifications, additions, or equivalent substitutions to the described specific embodiments without departing from the spirit of the present disclosure or the scope defined by the appended claims.

What is claimed is:

1. A cross-domain sharing method for zero-trust sensitive big data based on privacy computation, comprising following steps executed by a data user:

establishing an encrypted communication link based on a transport layer security (TLS) protocol with a data provider;

registering an application (app) of the data user in the data provider and specifying corresponding sensitive data;

downloading an application (app') embedded with an account information acquisition tool from the data provider;

receiving the sensitive data sent by the data provider through the encrypted communication link and a measurement (app_hash) of the application (app');

updating the application (app) of the data user as the application (app') embedded with the account information acquisition tool;

storing the sensitive data in a database instance X created for the sensitive data, and assigning account information X' created for the sensitive data to the application (app'), wherein the account information X' is created to access only the database instance X;

encrypting and storing the sensitive data of the database instance X and a corresponding relation between the measurement (app_hash) of the application and the account information X' in a server disk through a transparent file encryption service;

activating the application (app') in a trusted execution environment (TEE), acquiring the measurement (app_hash) of the application (app'), requesting the corresponding account information X' through the measurement (app_hash), and sending the account information X' to the application (app'); and causing the application (app') to log in the corresponding database instance X with the account information X' in the TEE to acquire the corresponding sensitive data and run a corresponding service logic in the TEE to use the sensitive data.

2. The cross-domain sharing method according to claim 1, wherein in a deployment phase, the encrypted communication link between the data user and the data provider is established as follows:

S11: activating by the data user an encrypted database module in the TEE;

S12: determining by a self-signature tool of the encrypted database module whether a self-signed certificate has been generated, if yes, decrypting a service-end certificate file (Cert1) and a service-end private key file (PrivateKey1) of an existing certificate through the transparent file encryption service, otherwise generating by the self-signature tool a self-signed certificate file comprising a root certificate file (CA1), the service-end certificate file (Cert1), and the service-end private key file (PrivateKey1), and encrypting and storing Cert1 and PrivateKey1 in the server disk through the transparent file encryption service; and S13: configuring the root certificate file (CA1) to the data provider as a verification certificate for establishing transport layer security (TLS) communication with the data provider.

3. The cross-domain sharing method according to claim 2, wherein a key used by the transparent file encryption service is configured as follows:

after the encrypted database module is activated, deriving by the TEE a unique corresponding key for the encrypted database module based on a measurement (hash) of the encrypted database module and configuring the key to the transparent file encryption service, so that a file to be stored in the server disk is transparently encrypted or decrypted.

4. The cross-domain sharing method according to claim 1, wherein when receiving an application registration request and a specified sensitive data use requirement, the data provider executes following steps:

examining the application (app), and if the examining is passed, embedding the account information acquisition tool in the application (app), and measuring the application (app) to obtain the app_hash; and binding the app_hash to a database name X, and sending a binding relation between the measurement (app_hash) of the application (app') embedded with the account information acquisition tool and the database name X to the data user through the encrypted communication link.

5. The cross-domain sharing method according to claim 4, wherein after receiving information sent by the data provider, the data user executes a following step:

creating the database instance X and the account information X' that accesses only the database instance X, and encrypting and storing the corresponding relation between the app_hash and the account information X' in the server disk through the transparent file encryption service, so that the account information X' is assigned to the corresponding application (app').

6. The cross-domain sharing method according to claim 5, wherein the application of the data user uses the corresponding sensitive data as follows:

activating the app' in the TEE, wherein the account information acquisition tool acquires an application running report embedded with an app_hash measured by the TEE, based on a remote certification mechanism of the TEE, and generates a self-signed certificate (ra-cert) embedded with report information;

initiating by the app' a request for establishing the encrypted communication link based on a TLS communication protocol to an account management service of the encrypted database module through the ra-cert, wherein the account management service is configured to manage database instances and account information of each database instance;

after receiving the request, extracting by the account management service the report from the certificate, and verifying the report through a public certificate (CA_TEE) provided by a TEE hardware provider;

if verification is passed, exacting the app_hash from the report, searching by the account management service for the corresponding account information X', and sending the account information X' to the account information acquisition tool;

after acquiring the account information X', writing, by the account information acquisition tool in the app', the account information X' into an environment variable of a TEE running environment;

after acquiring the account information X', activating by the account information acquisition tool a service application, acquiring by the service application the account information X' from the environment variable, and initiating a connection request to an ordinary database of the encrypted database module through the account information, wherein the ordinary database comprises the database instances;

verifying, by the ordinary database, login information, and after verification is passed, in respond to an app' request, sending the corresponding sensitive data to the app'; and acquiring by the app' the sensitive data, and running the corresponding service logic in an encrypted memory of the TEE to use the sensitive data.

7. The cross-domain sharing method according to claim 6, wherein the application running report is signed through a hardware private key of the TEE and embedded in the self-signed certificate (ra-cert).

* * * * *